United States Patent Office 3,138,551
Patented June 23, 1964

3,138,551
FILTERING COMPOSITION AND PROCESS
Robert L. Jones, Baton Rouge, La., assignor to Kaiser Aluminum & Chemical Corporation, Oakland, Calif., a corporation of Delaware
No Drawing. Filed Apr. 21, 1959, Ser. No. 807,775
6 Claims. (Cl. 210—75)

This invention relates to filtration and more particularly to the filtration of process liquors using a novel, improved filter aid.

Filtration operations involve the separation of solids from a liquid whereby the solids containing liquid is passed through a porous filter medium such as a filter cloth. A cake of solids is retained on the surface of the porous medium and if the porous medium is properly chosen, there should be a minimum of plugging or clogging of the pores, and a minimum of the finer solids should pass through the porous medium with the liquid.

The filtration of process liquors which contain slimy, finely divided solids and/or colloidal particles, is particularly difficult since the solids and/or particles have a tendency, depending on their size, to pass through the porous filter medium with the liquor and/or clog the pores of the filter medium. This results in a reduced rate of filtration. To overcome this problem, proper use of certain filter aids has been successful. The filter aid promotes filtration by acting as a clarifying agent, improves filtration rates, and prevents clogging or plugging of the pores of the filter medium.

Various filter aids, which are finely divided materials, are presently used, such as kieselguhr, diatomaceous earth, charcoal, Fuller's earth, and the like. Many of the presently available filter aids have limited application and are not suitable for use, for example, in filtering hot, alkaline liquors. In the Bayer process for the production of alumina from bauxite ore, it is necessary to separate from the hot caustic aluminate extraction liquor, subsequent to the digestion step, the insoluble material of the ore commonly called "red mud." A settling or thickening step is usually performed on the red mud laden liquor prior to a filtration step, to remove the bulk of the red mud. The filtration step removes the portion of red mud particles which remain suspended in the hot liquor.

It would be very desirable to use efficient and valuable filter aids such as kieselguhr, diatomaceous earth, or any other siliceous material in the filtration step of red mud laden liquors in the Bayer process or in any other process which utilizes strongly alkaline or caustic liquor and filtration thereof is required. However, the use of the filter aids mentioned is not possible due to the fact that the caustic liquor will attack the siliceous material. Since the caustic will attack the siliceous filter aids, the available filter aids usable with caustic liquors are mostly limited to those of a carbonaceous material such as ground coke, or a special material prepared from finely divided bituminous particles described in British Patent No. 786,207. In U.S. Patent No. 2,822,091 to James L. Martine, Jr., a filter aid is described for use in filtering sodium aluminate liquors which consists of a classified fraction of red mud formed in producing sodium aluminate solution by caustic digestion of alumina-bearing ore. Another material used as a filter aid with caustic liquors is paper pulp such as "Solka-floc."

The above-mentioned filter aids usable with caustic liquors have definite limitations. Carbonaceous materials such as the ground coke do not ordinarily have the desirable particle characteristics. The special material of British Patent No. 786,207 is an improvement over ground coke, but the particles are relatively weak and friable and make fines which must be classified out when the material is used as a filter aid. The paper pulp is not entirely resistant to the action of hot caustic liquor and will contaminate the liquor with soluble organic salts.

The problem involved in the use of a filter aid in the Bayer process is particularly important in the processing of certain types of bauxite, such as that from Jamaica, which yield an almost colloidal red mud residue which is difficult, or if present in appreciable amounts, almost impossible to filter. Such a bauxite will not readily furnish in sufficient amounts a classified fraction of the appropriate particle sizes to act as a filter aid as described in the above-mentioned Patent No. 2,822,091. Furthermore, Jamaican bauxite red mud residues are so difficult to filter that a classified fraction from any bauxite residue is probably insufficient to solve the problem.

A calcium carbonate sludge has found use as a filter aid in the Bayer process. The sludge is obtained from a causticizing operation which involves reacting slaked lime, $Ca(OH)_2$, with a sodium carbonate solution to produce sodium hydroxide in solution and a precipitated sludge of solid calcium carbonate. The calcium carbonate sludge produced is fairly effective as a filter aid. However, there are times when the calcium carbonate sludge produced by the causticizing operation contains very fine particle sizes and it cannot be used as a filter aid.

The present invention provides an improved method of filtering process liquors, and in particular hot alkaline liquors, by the use of a novel, improved filter aid.

The novel, improved filter aid of this invention comprises the aragonite crystal form of calcium carbonate which unexpectedly improves the filtration of process liquors, and in particular hot alkaline liquors.

In accordance with the invention, it was found that the effectiveness of a filter aid is not only based on its size, but also on crystal system and habit. There are several crystal systems of calcium carbonate. Calcite is the more common form found in nature. Almost all the inland deposits of limestone consist of the stable calcite mineral. A less stable and less common form sometimes found in nature is aragonite. In a copending U.S. application S.N. 822,491 filed June 24, 1959 there is described a novel method of producing aragonite by modifying the crystallizing conditions of the causticizing reaction between the slaked lime and sodium carbonate. Table I lists some of the identifying characteristics of the calcite and aragonite forms.

Table I

IDENTIFYING CHARACTERISTICS OF ARAGONITE AND CALCITE

| Mineralogy [1], [2] | Argonite | Calcite |
|---|---|---|
| Crystal System | Orthorhombic (Commonly acicular). | Hexagonal (Rhombohedral Div.). |
| Color Occurrence | White Shells, coral, hot springs. | White Limestone, marble. |
| Stability | Unstable (Changes to calcite at 100° C. in few days). | Stable. |
| Specific Gravity | 2.93 | 2.711. |

[1] E.S. Dana, A Textbook of Mineralogy, 4th ed., John Wiley and Sons Inc., 1932.
[2] A. N. Winchell, Elements of Optical Mineralogy, 3rd ed., John Wiley and Sons Inc., 1933.

The calcium carbonate sludge usually produced by the reaction referred to heretofore, was found to be almost entirely calcite in crystal structure. The calcite particles in the sludge, when viewed under a microscope, appear as rough spheres about 2.5 microns in diameter with almost no variation in size.

In the above mentioned copending application, the aragonite produced appears as single needle-like particles or needle clusters when viewed under a microscope. The particle size varies from about one to five microns in width and from about five to about forty microns in length.

Because of their differences in crystal habit (shape) and size, the two crystal forms of calcium carbonate were evaluated as to their relative effectiveness as filter aids. The following examples demonstrate that the aragonite form unexpectedly is far superior in its effectiveness as a filter aid than the calcite form.

*Example 1*

A sample of sodium aluminate liquor was obtained from a Bayer Plant operation. The sample was taken from the overflow of a mud settler wherein the bulk of suspended red mud is settled from the liquor. The liquor sample contained 50 mg./l. of mud particles and was at a temperature of 200° F. In each of the examples a separate portion of the liquor sample was used in the tests to determine the filtration rates of the liquor using a specified filter aid composition.

To a portion of the above liquor sample, 0.5 g./l. of a 100% aragonite filter aid was added. The liquor was filtered through a laboratory filter press fitted with a canvas filter cloth. The filtration rate was calculated to be an average of 64.1 gallons per square foot of filter cloth per hour for a period of 8 hours. This rate of filtration with the 100% aragonite filter aid was taken as a standard to determine the relative filterability of various filter aid compositions in the following examples. Relative filterability is defined in this specification as the percent relative effectiveness of a filter aid when compared to a standard filter aid, e.g., two constant filtrations tests are carried out holding all conditions constant (mud concentration, etc.) except the type of filter aid used. Suppose the test utilizing the filter aid being evaluated yields a filtrate volume per unit of time equal to one-half the filtrate volume per unit time of the test utilizing the standard filter aid. The filter aid evaluated would then have a 50% relative filterability.

*Example 2*

Another portion of the liquor sample was filtered and all the conditions specified in Example 1 remained the same in this test except the filter aid which comprised a mixture of 75% aragonite and 25% calcite. The filtration rate was calculated to be an average of 53.3 gallons per square foot per hour for a period of 8 hours. The relative filterability based on the standard in Example 1 was 83.1%.

*Example 3*

Another portion of the liquor sample was filtered and all the conditions specified in Example 1 remained the same in this test except the filter aid which comprised 50% aragonite and 50% calcite. The filtration rate was calculated to be an average of 45.1 gallons per square foot per hour for a period of 8 hours. The relative filterability based on the standard of Example 1 was 70.3%.

*Example 4*

Another portion of the liquor sample was filtered and all the conditions specified in Example 1 remained the same in this test except the filter aid which comprised 25% aragonite and 75% calcite. The filtration rate was calculated to be an average of 37.7 gallons per square foot per hour for a period of 8 hours. The relative filterability based on the standard of Example 1 was 58.8%.

*Example 5*

Another portion of the liquor sample was filtered and all the conditions specified in Example 1 remained the same in this test except the filter aid which was 100% calcite. The filtration rate was calculated to be an average of 30.0 gallons per square foot per hour for a period of 8 hours. The relative filterability based on the standard of Example 1 was 46.8%.

The examples clearly demonstrate the improved filtration results obtained with an aragonite containing filter aid. A filter aid containing 100% aragonite is far superior to one containing 100% calcite. Increasing the proportion of aragonite in calcite-aragonite filter aids increases the filterability of the red-mud laden liquors. Even the presence of lesser amounts of aragonite in a filter aid mixture increases the effectiveness of the filter aid. This is shown by Example 4 wherein the presence of only 25% aragonite in the filter aid mixture increases the relative filterability to 58.8%, whereas the relative filterability of a 100% calcite filter aid is 46.8%.

Aside from the advantages derived as shown above, the use of aragonite in filter aids leads to improved clarity of filtrate. The improved clarity of filtrate is especially advantageous in alumina production wherein the alumina precipitated from a filtered caustic aluminate liquor is improved in quality.

Generally speaking, the amount of filter aid to be used would depend upon the requirements of the particular process liquor being filtered. For example, in the filtration of red mud laden caustic aluminate liquors preferably amounts in the range of 0.1 to 10.0 grams per liter are suitable. In filtering other process liquors, amounts up to 20 grams per liter or more may be necessary.

The aragonite filter aid can be used in the filtration of process liquors which do not chemically react with the aragonite. The aragonite filter aid may also be used as a "precoat," i.e., applying the filter aid to the porous filter medium, prior to the filtration operation, by various methods such as by passing a mixture of a clear liquid and filter aid through the filtering apparatus thereby coating the filter medium with a layer of the filter aid. Alternatively, the aragonite filter aid may be continuously added in predetermined amounts to the liquor to be filtered as it is fed to the filtering apparatus. The use of a precoat leads to longer filter cloth life.

The aragonite containing filter aids can be used in any type of filtration methods and apparatus which use a porous filter medium. For example, the aragonite filter aids of this invention may be used in gravity, pressure, and vacuum filtration operations and the like.

In addition to the filtration of caustic aluminate liquors in which the aragonite filter aids find particular application, the aragonite containing filter aids may be used with various other types of liquors or solutions, for example, sugar solutions, various oils, metallurgical solutions, and various other chemical solutions and liquors.

What is claimed is:

1. An improved filter aid composition useful in filtering liquors containing suspended solids comprising in admixture the orthorhombic and hexagonal crystalline forms of calcium carbonate, said orthorhombic calcium carbonate being present in the form of needle-like particles and needle clusters.

2. The composition of claim 1 wherein the orthorhombic form is present in a major amount and which contains a substantial amount of calcite.

3. A process of filtering caustic aluminate liquor containing suspended red mud particles which comprises coating a porous filter medium with a layer of filter aid comprising in admixture the orthorhombic and hexagonal crystalline forms of calcium carbonate and subsequently filtering said liquor through said layer of filter aid and said filter medium, said orthorhombic calcium carbonate being in the form of needle-like particles and needle clusters.

4. A process of filtering caustic aluminate liquor according to claim 3 wherein the coating of the porous filter medium comprises adding the filter aid to said liquor prior to filtering.

5. A process of filtering caustic aluminate liquor containing suspended red mud particles which comprises coating a porous filter medium with a layer of filter aid comprising orthorhombic calcium carbonate and filtering said liquor through said layer of filter aid and said filter medium, said orthorhombic calcium carbonate being in the form of needle-like particles and needle crystals.

6. A process of filtering caustic aluminate liquor according to claim 5 wherein the coating of the porous filter medium comprises adding the filter aid to said liquor prior to filtering.

References Cited in the file of this patent

UNITED STATES PATENTS

| 1,638,803 | Gibson et al. | Aug. 9, 1927 |
| 2,715,466 | Esposito | Aug. 16, 1955 |
| 2,822,091 | Martine | Feb. 4, 1958 |

OTHER REFERENCES

Hackh's Chemical Dictionary, 3rd Ed., Printed in 1950 by the Blakiston Co., Philadelphia; page 157, column 1.